EQUIVALENT CIRCUIT OF FEEDBACK STABILIZED SERVO

INVENTOR.
JOHN A. INDERHEES
BY Alden D. Redfield
Irvin P. Garfinkle
ATTORNEYS.

Sept. 13, 1966 J. A. INDERHEES 3,273,035

SYSTEM OF STABILIZATION FOR A SAMPLE-DATA SERVO USING A VARIABLE GAIN SAMPLED-DATA LOOP AND A PORPORTIONAL LOOP

Filed Nov. 27, 1963 3 Sheets-Sheet 2

INVENTOR.
JOHN A. INDERHEES
BY Alden D. Redfield
Irwin P. Garfinkle
ATTORNEYS.

Sept. 13, 1966    J. A. INDERHEES    3,273,035

SYSTEM OF STABILIZATION FOR A SAMPLE-DATA SERVO USING A VARIABLE GAIN SAMPLED-DATA LOOP AND A PORPORTIONAL LOOP

Filed Nov. 27, 1963    3 Sheets-Sheet 1

FEEDBACK STABILIZED SERVO

INVENTOR.
JOHN A. INDERHEES
BY Alden D. Redfield
Irwin P. Garfinkle
ATTORNEYS.

United States Patent Office
3,273,035
Patented Sept. 13, 1966

3,273,035

SYSTEM OF STABILIZATION FOR A SAMPLE-DATA SERVO USING A VARIABLE GAIN SAMPLED-DATA LOOP AND A PROPORTIONAL LOOP

John A. Inderhees, Cincinnati, Ohio, assignor to Avco Corporation, Cincinnati, Ohio, a corporation of Delaware Filed Nov. 27, 1963, Ser. No. 326,335
6 Claims. (Cl. 318—18)

This invention relates to sampled-data servo control system, and more particularly to the means for stabilizing such servo system during the intervals between data samplings.

An analysis of sampled-data servo systems reveals several features different from those found in continuous systems. Whereas in continuous systems the error is continuously determined and used, in a sampled-data system the error is measured, the correction is applied, and then the system passes through a waiting period before the error is again determined. The most obvious deleterious result of this waiting period is the generally greater tendency for the sample-data closed-loop system to be unstable, as a result of the desire to over-correct the errors which occur in the interval between samples. The primary object of this invention is to avoid this result by means of a secondary feedback loop for effectively maintaining the loop closed during the interval between samples.

In general, the servo system of this invention generates an error signal by comparing the input signal with the feedback from the output signal in a summer. Either the input or feedback, or both, may be signals which can produce the correct error signal for only short periods of time. This occurrence may be periodic or aperiodic. A sampler samples the error signal at the correct times and converts the error signal to a train of spaced pulses which are then held in a holding circuit and applied to the controller portion of the servo system from which the output signal is derived. A primary feedback path is established from the signal output to the summer. A secondary feedback is established from the signal output of the servo to the input of the controller, but is operable as a feedback network only during the intervals between samplings and produces a voltage representing incremental movement of the output during that interval only.

In order to stabilize a data sampled servo system using a sample-hold, it is necessary either to reduce the gain of the system or to maintain a very high sampling rate with respect to the other time constants in the servo loop. In many cases the sampling rate is fixed by parameters not within the control of the servo designer, and therefore it has been necessary to reduce loop gain, resulting in sluggish response and larger residual errors. It is therefore another object of this invention to provide means in such a servo system for maintaining a higher gain while permitting a low sampling rate and a stable system.

Another object of this invention is to provide a sampled-data servo system utilizing a sample-hold and having primary and secondary feedback networks, the primary network being completed during a sampling period, the secondary network being completed during the intervals between sampling.

For other objects and advantages and for a clearer understanding of this invention, reference should now be made to the following specification and to the accompanying drawings in which:

FIGURE 1 shows a prior art servo incorporating a data sampler and a sample-hold;

FIGURES 2*a* and 2*b* are curves showing a typical signal input and the output from the sample-hold circuit;

Figure 8:
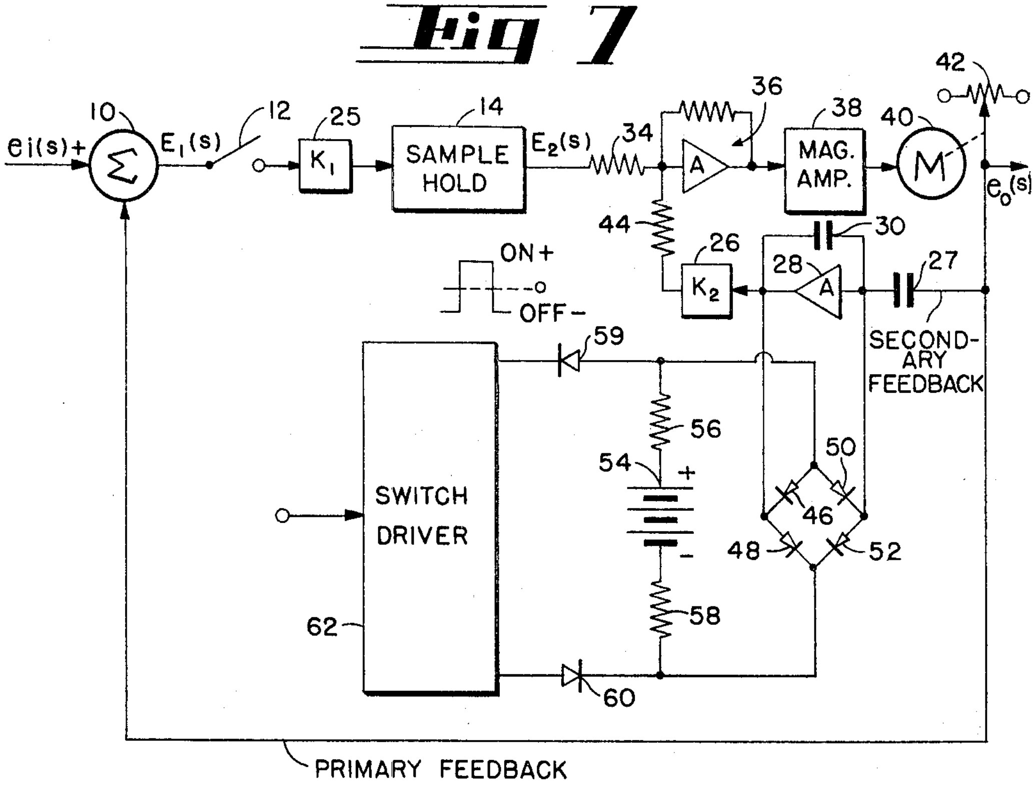
FIGURE 8 illustrates a particular circuit useful in the preferred embodiment of FIGURE 6.
Figure 1:
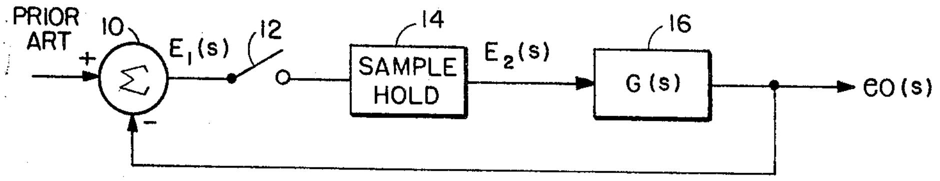

A prior art servo of the type using a sampled error signal is shown in FIGURE 1, the various circuit variables each being expressed in terms of its Laplace transform. The input variable $ei(s)$ and the controlled output variable $eo(s)$ are both applied to a summer 10, from which the error signal $E_1(s)$ is derived. The error signal represents the difference between the input and controlled variables. The error signal $E_1(s)$ is applied to a sampler, in this case a switch 12, which operates periodically or aperiodically to close the servo loop for short periods. The sampled error signal $E_1(s)$ is applied to a sample-hold circuit 14 where the value of the error signal is stored until the next time the sampler switch 12 is closed. The output of the sample-hold circuit 14 is then applied to a controller 16, represented as a transfer function $G(s)$, which may be electronic, mechanical, or electro-mechanical components. For example, the controller may comprise a summing amplifier, a magnetic amplifier and a motor-driven potentiometer, as shown in FIGURE 8.

Figure 2A:
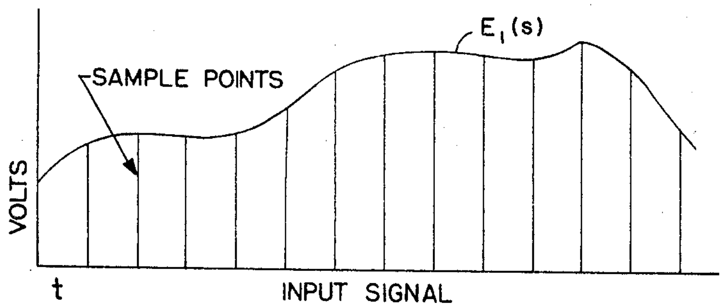
Figure 2B:
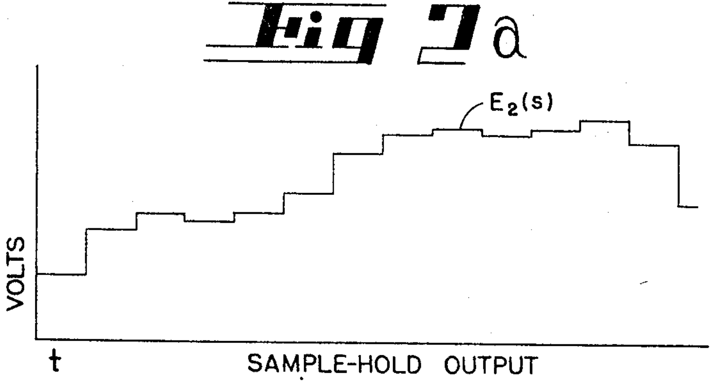

FIGURE 2*a* illustrates the error signal $E_1(s)$ with respect to time, the vertical lines representing various periodic sampling points. The output $E_2(s)$ of the sample-hold circuit with respect to time is represented in FIGURE 2*a*. It will be noted that the voltage at each sampling instant is held until the next sampling instant so that a step function is developed. Neglecting the sample-hold circuit for the moment and considering a closed-loop servo consisting only of a linear transfer function $G(s)$, the common procedure in the design of the transfer function is to insure a stable system under all operating conditions. As an example, the transfer function $G(s)$ may be:

$$G(s)=\frac{K_v}{s(1+T_1s)(1+T_2s)}$$

where $K_v$ is the velocity constant gain;
$s$ is the Laplace variable which may be replaced by $j\omega$; and
$T_1$ and $T_2$ are time constants found in practical servo systems.

For this servo system to be stable, the gain of the servo loop must be less than one at 180° phase shift. The above equation indicates a conditionally stable system since at infinite frequency there is a phase shift of 270°, and therefore the gain $K_v$ must be adjusted for all conditions of operation to provide a gain of less than one at 180° phase shift.

Figure 3:
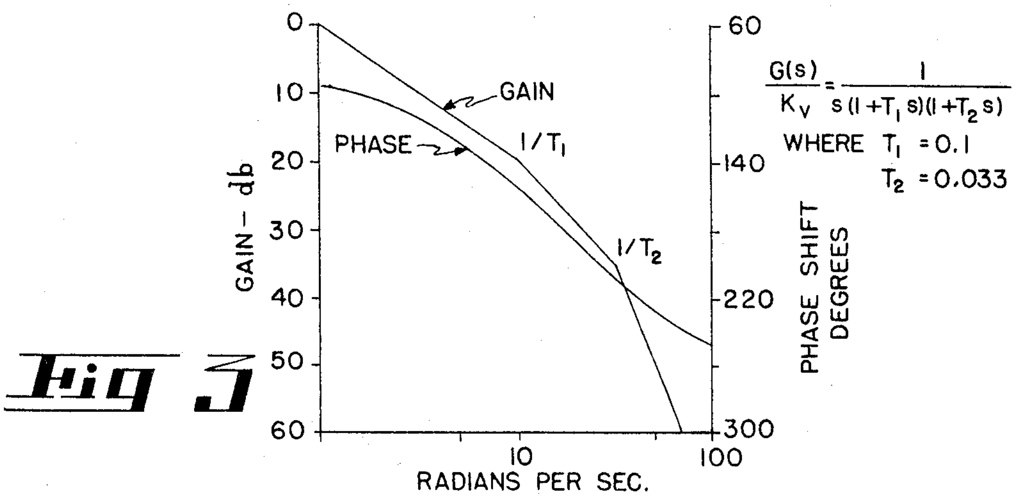
FIGURES 3–5 illustrate the performance under specified conditions of the servo of FIGURE 1.

FIGURE 3 shows the gain and phase characteristics for the transfer function $G(s)$ used in the example. The plot assumes $T_1$ equal to .1 second and $T_2$ equal to .033 second. The gain versus frequency characteristic of the transfer function has breaks of various frequencies determined by the values of time constants $T_1$ and $T_2$, and in the particular case 180° phase shift occurs at about 18 radians per second. At 18 radians, $G(s)/K_v$ is about 28 db.

Figure 4:
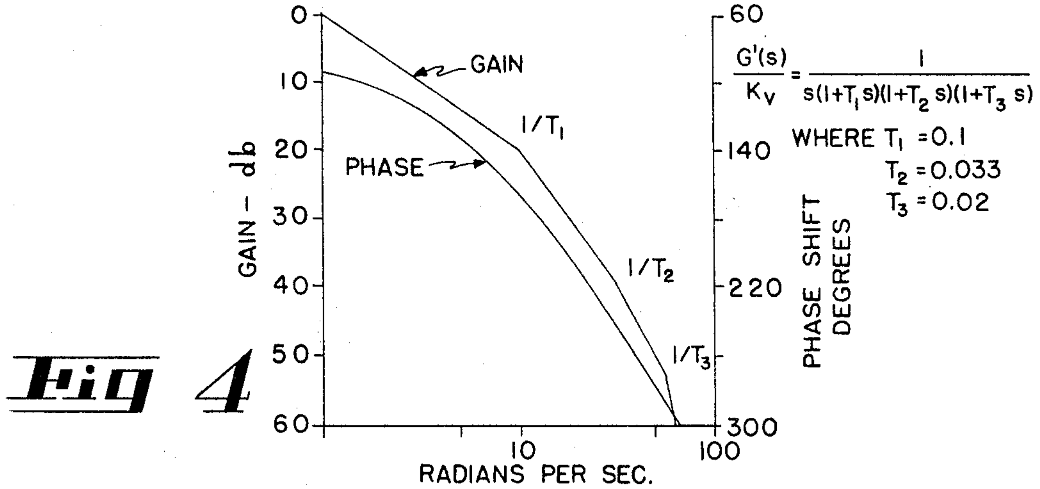
Figure 5:
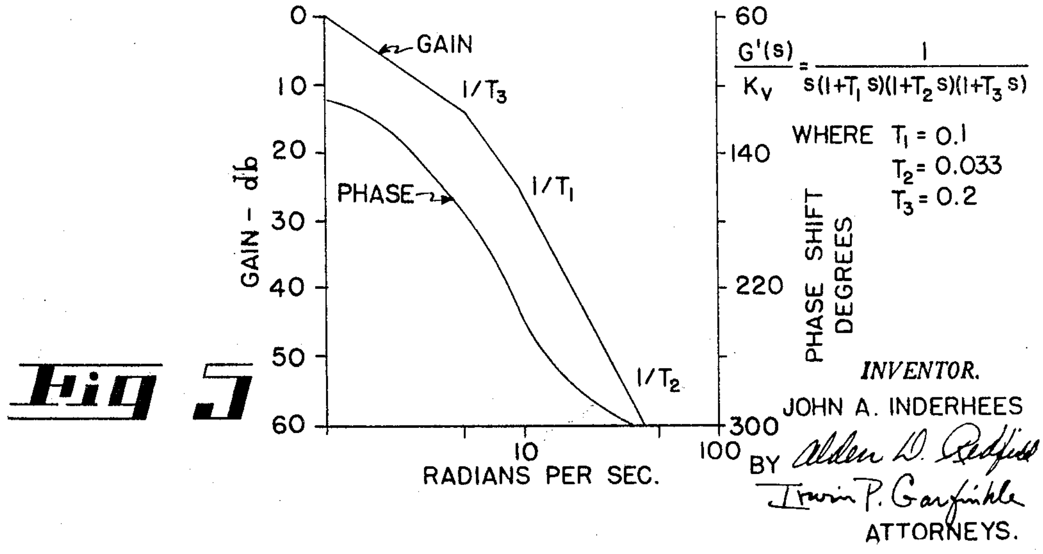

The effect of the sample-hold circuit is to introduce an additional break frequency into the servo system. If the sampling frequency is higher than the highest break frequencies already present, the sampler will not seriously affect the servo operation. FIGURE 4 shows the effect on the servo loop of a sample-hold circuit having a break frequency of 50 radians per second. This results in an additional phase shift so that the 180° phase shift now occurs at 13 radians per second, and at this point $G'(s)/K_v$ is about 23 db. Thus, as compared with a system without a sample-hold circuit, there is a relatively small change of 5 radians per second at which the 180° phase shift occurs, resulting in a small change in gain. However, if the sampling frequency is of the same order or lower than the break frequencies encountered in the $G(s)$ network, the sample-hold circuit will more seriously affect loop stability. FIGURE 5 shows the effect of a sample-hold circuit with a break frequency of 5 radians per second. In this case the 180° phase shift occurs at 5.8 radians per second, requiring a relatively major change in gain to maintain loop stability.

There are a number of ways to describe the sample-hold circuit mathematically. One description of the system plotted in FIGURES 4 and 5 is a simple lag with a break frequency of one-fourth the sample rate. This description is valid approximately in the vicinity of the break frequency. The loop transfer function is:

$$G'(s)=\frac{K_v}{s(1+T_1s)(1+T_2s)(1+T_3s)}$$

where $$T_3=\frac{4}{2\pi f}$$

and $f$ = sampling frequency

Therefore, FIGURES 4 and 5 are representative of sampling at the rates of 31.8 and 3.2 per second.

The foregoing analysis shows that the sample-hold introduces additional phase shift into the loop, and the loop gain $K_V$ must be reduced, as compared with a loop not having the sample-hold circuit but operating in the same frequency environment.

The sample-hold circuit's effect on the loop, when operating at low sampling frequencies may be visualized in the following manner: Consider the loop's operation in the interval between samples. The error existing at instant of sampling is determined and held. This error signal $E_2(s)$ is used to drive the controller and output $eo(s)$. However, there is no information available in the interval between samples, on how far the controlled variable $eo(s)$ has moved to correct the existing error. This shows that the loop needs to be closed between samples. The present invention illustrated in FIGURE 6 provides the means for closing the loop and stabilizing the loop without deteriorating the loop gain as compared with a system not using a sample hold.

Figure 6:
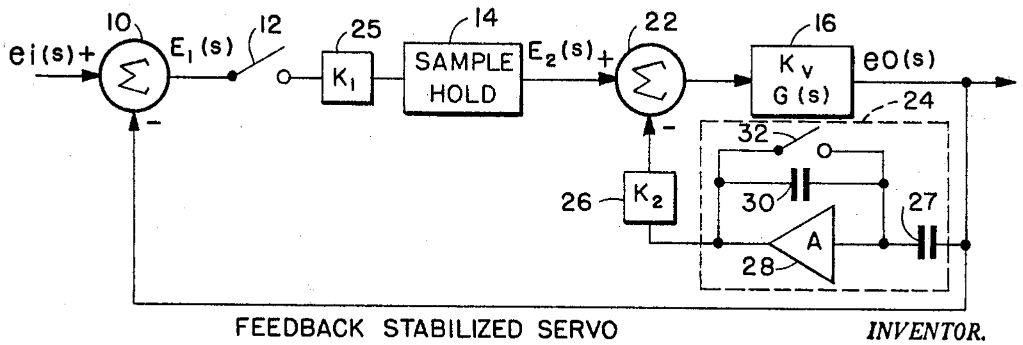
FIGURE 6 illustrates in diagrammatic form a preferred embodiment of this invention.

The servo loop illustrated in FIGURE 6 includes the same elements of the prior art sample-hold servo loop illustrated in FIGURE 1, but in addition includes a summer 22 interposed between the output of the sample hold 14 and the controller 16, and the output from the controller 16 is fed back in a secondary feedback loop through a differentiating integrator 24 and a gain control element 26 ($K_2$) to the summer 22. A gain control element 25 ($K_1$) is also inserted between the switch 12 and the sample-hold 14. The differentiating integrator 24 includes a capacitor 27 which functions as a differentiator while amplifier 28 and capacitor 30 function as an integrator. A switch 32 connected across the capacitor 30 operates synchronously with the sampling switch 12. When the sampling switch 12 closes, sampling the error signal $E_1(s)$, the integrating capacitor 30 in the secondary feedback circuit is discharged. In the interval between samples both samples switches 12 and 32 are open, and while the error signal is held and applied to one input of the summer 22, the net change in the output signal $\Delta eo(s)$ is accumulated on the capacitor 30 and applied through the gain control element 26 to the other input of the summer 22 where a subtraction of the applied voltages takes place. Thus, the feedback in the secondary path represents the movement of the controlled variable $eo(s)$ since the last sampling. When the switches 12 and 32 again close, the charge on the capacitor 30 is discharged through the switch, thereby discarding the stored information, i.e., the incremental movement of the controlled $eo(s)$ or $\Delta eo(s)$. The operation is repeated for each succeeding sampling.

The effect of the samplers can be described by their mathematical equations. In Control System Synthesis, by Truxal, page 509, the author shows that the sample-hold circuit has an $s$ transform (Laplace transform) that can be expressed:

$$E^*(s)=\sum_{n=0}^{\infty}e(nT)e^{-nTs}$$

where $e(nT)$ is the input at sample points;
T is the sampling interval.

The sampler transform results in a power series in $s$. For purposes of this description, it is sufficient to say that the sample-hold circuit has an $s$ transform of $J(s)\equiv E^*(s)$.

Figure 7:
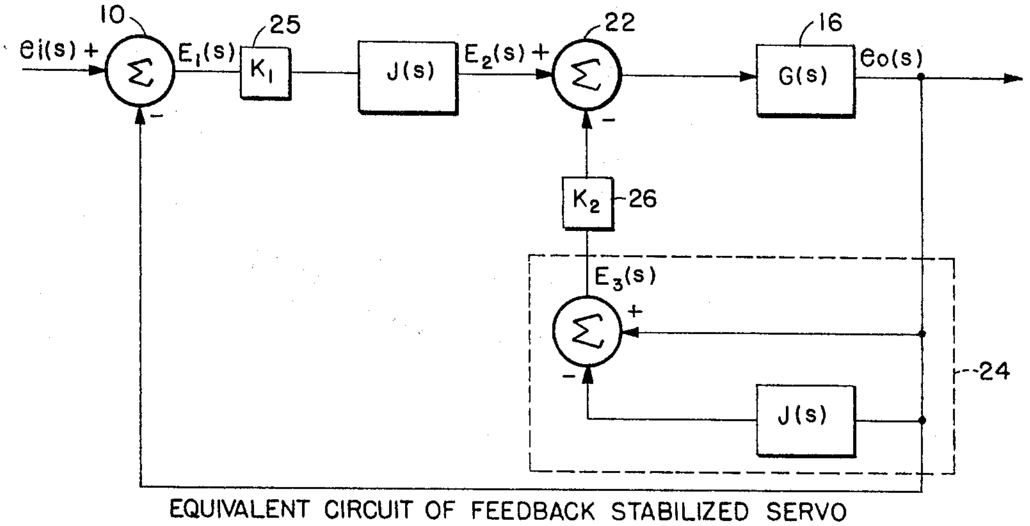
FIGURE 7 illustrates the mathematical equivalent of the preferred form of this invention illustrated in FIGURE 6.

The auxiliary feedback loop, as implemented in this invention, can be replaced in mathematical terms by a sample-hold circuit in parallel with a directly connected feedback, see FIGURE 7. The circuit in FIGURE 7 is identical to that in FIGURE 6 in their essential performance parameters, and the over-all transfer function of the loops now can be developed. This secondary loop is:

$$E_3(s)=eo(s)[1-J(s)]$$

Likewise, the complete auxiliary loop is:

$$eo(s)=\frac{E_2(s)G(s)}{1+K_2G(s)[1-J(s)]}$$

The complete open loop response is:

$$eo(s)=\frac{E_1(s)K_1J(s)G(s)}{1+K_2G(s)[1-J(s)]}$$

The closed loop transfer function is:

$$eo(s)=\frac{\dfrac{K_1J(s)G(s)}{1+K_2G(s)[1-J(s)]}}{1+\dfrac{K_1J(s)G(s)}{1+K_2G(s)[1-J(s)]}}ei(s)$$

Reducing the closed loop equation:

$$eo(s)=\frac{K_1J(s)G(s)}{1+K_2G(s)-K_2G(s)J(s)+K_1G(s)J(s)}ei(s)$$

or $$eo(s)=\frac{K_1J(s)G(s)}{1+K_2G(s)+G(s)J(s)[K_1-K_2]}ei(s)$$

The last equation can be compared to the loop transfer function without the auxiliary feedback loop:

$$eo(s)=\frac{K_1G(s)J(s)}{1+K_1G(s)J(s)}ei(s)$$

These two equations, with and without the loop, demonstrate that the feedback loop removes the effects of the sample-hold circuit from the closed loop servo. If the gain $K_1$ equals the gain $K_2$ under all conditions, complete cancellation is effected.

Thus, when FIGURE 6 is redrawn in its mathematical equivalence, as illustrated in FIGURE 7, the secondary feedback loop through the differentiating integrator 24 serves to cancel the effects of the sample-hold function $J(s)$ (the combination of the sampling switch 12 and the sample-hold circuit 14).

FIGURE 8 illustrates a specific embodiment of the invention which was successfully reduced to practice. In FIGURE 8 the output $E_2(s)$ from the sample-hold circuit 14 is applied through a resistor 34 to a summing amplifier 36, the output of which is applied to a magnetic amplifier 38 and then to a motor 40 for driving an output potentiometer 42. The voltage developed across the potentiometer 42, representing the controlled variable $eo(s)$, is fed back through the differentiating integrator 24, gain control element 26, and a resistor 44 to the summing amplifier 36. The switch 32 is eliminated and an electronic switch comprising four diodes 46, 48, 50, and 52, connected in a back-to-back configuration, are connected across the capacitor 30. A battery 54 connected in series with resistors 56 and 58 serves to discharge capacitor 30 when diodes 59 and 60 are reverse biased by the "ON" output of a switch driver 62. With the switch driver 62 turned to "OFF," diodes 59 and 60 conduct, reverse biasing the switch diodes 46, 48, 50, and 52. The switch driver 62 and the switch 12 are driven synchronously. In actual practice, switch 12 is an electronic switch and is driven by the same source as switch 62.

From the foregoing description it is apparent that this novel servo system is subject to many modifications and adaptions within the scope and spirit of the invention. It is intended therefore that this invention be limited only by the following appended claims as interpreted in the light of the prior art.

What is claimed is:

1. In a sampled-data servo system including a source of input variable signals, a summer having first and second inputs and an output, said first input being supplied with said input variable signals from said source, sampling means for sampling the output of said summer, a sample-hold circuit for holding said sampled signal in the interval between samplings to produce a sample-hold output signal, a controller for producing an output signal, said controller having an input and an output, said input being supplied with said sample-hold output signal, and a primary negative feedback path from the output of said controller to said second input of said summer to establish a closed primary servo loop, the improvement comprising:

a second summer interposed between said sample-hold circuit and said controller, said summer having one input supplied from the output of said sample-hold circuit and having a second input supplied from a secondary negative feedback path connected from the output of said controller, said secondary feedback establishing a secondary loop, said secondary negative feedback path including means for producing a feedback variable proportional to the change in said output variable signals during intervals between input samples, whereby said secondary feedback loop effectively maintains a closed loop servo in the intervals between samples;

and first adjustable gain control means in said primary loop, and second adjustable gain control means in said secondary loop, said means being adjustable to provide equal gains in said loops.

2. In a sampled-data servo system including a source of input variable signals, a summer having first and second inputs and an output, said first input being supplied with said input variable signals from said source, sampling means for sampling the output of said summer, a sample-hold circuit for holding said sampled signal in the interval between samplings to produce a sample-hold output signal, a controller for producing an output signal, said controller having an input and an output, said input being supplied with said sample-hold output signal, and a primary negative feedback path from the output of said controller to said second input of said summer to establish a closed primary servo loop, the improvement comprising:

a second summer interposed between said sample-hold circuit and said controller, said summer having one input supplied from the output of said sample-hold circuit and having a second input supplied from a secondary negative feedback path connected from the output of said controller, said secondary feedback establishing a secondary loop, said secondary negative feedback path including means for producing a feedback variable proportional to the change in said output variable signals during intervals between input samples, said last means comprising a differentiator in series with an integrator.

3. The invention as defined in claim 2, and means for discharging said integrator simultaneously with each sampling of the output of said summer.

4. The invention as defined in claim 3 wherein said integrator includes a capacitor charged with the output of said differentiator, and wherein said means for discharging said integrator comprises a low impedance switch connected across said capacitor.

5. The invention as defined in claim 3 wherein said means for sampling and said means for discharging said integrator comprises simultaneously operated switches.

6. The invention as defined in claim 5 wherein said means for discharging said integrator comprises a normally back-biased diode; and means responsive to said sampling for rendering said diode conductive.

References Cited by the Examiner

UNITED STATES PATENTS

| | | | |
|---|---|---|---|
| 2,832,887 | 4/1958 | Kirschner | 328—121 |
| 3,052,851 | 9/1962 | Herberling | 328—121 |
| 3,075,086 | 1/1963 | Mussard | 340—173 |
| 3,119,984 | 1/1964 | Brandt et al. | 328—151 X |

OTHER REFERENCES

Tou, Julius T.: Digital and Sampled Data Control Systems, N. Y., McGraw-Hill Book Company, 1959, pp. 228–230 and 608.

ORIS L. RADER, *Primary Examiner.*

JOHN F. COUCH, *Examiner.*

T. LYNCH, *Assistant Examiner.*